March 5, 1957 M. E. METCALF 2,784,034
TANK CLEANING MACHINE
Filed May 20, 1955
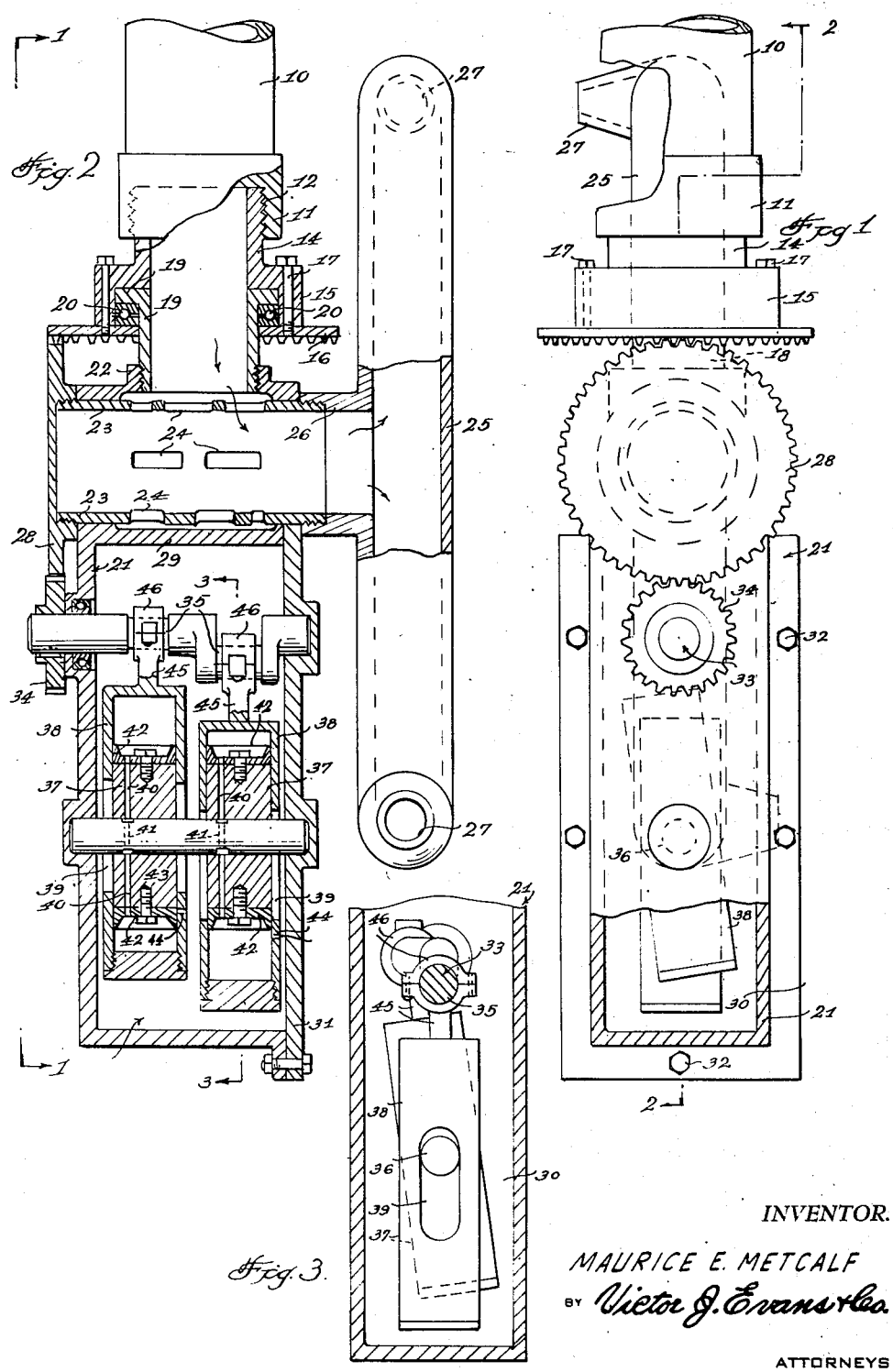
INVENTOR.
MAURICE E. METCALF
BY *Victor J. Evans & Co.*
ATTORNEYS

United States Patent Office 2,784,034
Patented Mar. 5, 1957

2,784,034

TANK CLEANING MACHINE

Maurice E. Metcalf, Port Arthur, Tex.

Application May 20, 1955, Serial No. 509,947

5 Claims. (Cl. 299—69)

This invention relates to a fluid handling mechanism, and more particularly to a mechanism for use in cleaning surfaces by means of fluid.

This invention is an improvement over the tank cleaning mechanism shown and described in the Patent No. 2,681,250.

The object of the invention is to provide a fluid handling mechanism which includes a novel braking means which serves to regulate the rotation of the nozzles as the fluid, such as water discharges from the nozzles.

Another object of the invention is to provide a fluid discharge mechanism for use in cleaning tanks or other surfaces whereby fluid such as water issues from movable nozzles onto the surfaces being cleaned whereby the surfaces will be readily cleaned of foreign matter or the like, and whereby there is provided a novel braking mechanism which insures that the fluid issuing from the nozzles issues as a steady stream instead of a spray.

A further object of the invention is to provide a fluid handling mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a sectional view taken on the line 1—1 of Figure 2.

Figure 2 is a sectional view taken on the line 2—2 of Figure 1.

Figure 3 is a sectional view taken on the line 3—3 of Figure 2.

Referring in detail to the drawings, the numeral 10 designates a hose or tube which is adapted to be connected to a suitable source of supply of fluid such as water under pressure. The tube 10 includes an enlarged flange 11 which is threaded interiorly as at 12, Figure 2. There is further provided a bushing 14 which includes a threaded portion that engages the threaded flange 11, and the bushing 14 includes an enlarged section 15. A first gear member 16 is connected to the enlarged portion 15 of the bushing 14 by means of suitable securing elements such as the bolts 17. The gear member 16 is stationary. Arranged in end to end relation with respect to the bushing 14 is a rotary sleeve 18 which includes an annular flange 19 that abuts a bearing race 20. A hollow housing 21 includes a portion 22 which is arranged in threaded engagement with and carried by the sleeve 18. Thus, as the sleeve 18 rotates the housing 21 rotates therewith.

Extending transversely through the upper portion of the housing 21 and carried thereby is a cylindrical neck 23 which is provided with a plurality of slots or openings 24 whereby fluid can pass from the sleeve 18 into the interior of the neck 23. A nozzle 25 includes a cylindrical portion 26 which is arranged in threaded engagement with an end of the neck 23. The nozzle 25 is provided with diametrically opposed oppositely extending apertures or projecting portions 27 through which the fluid is adapted to discharge onto the surface being cleaned. A second gear member 28 is connected to the other end of the neck 23, and the gear member 28 meshes with and travels around the first gear member 16.

A partition 29 in the housing 21 defines a compartment 30 in the lower portion of the housing 21, and a plate 31 is connected to the main portion of the housing 21 through the medium of bolt and nut assemblies 32. The compartment 30 is adapted to hold a suitable quantity of fluid such as hydraulic brake fluid. Rotatably mounted in the housing 21 is a crankshaft 33 which has a gear member 34 keyed to an end thereof, and the gear member 34 meshes with the gear member 28 so that as the gear member 28 rotates, the crankshaft 33 will be rotated. The crankshaft 33 is provided with a pair of offset portions 35 for a purpose to be later described.

Journaled in the lower portion of the housing 21 is a pin 36, and mounted on the pin 36 is a pair of pistons 37. A hollow cylinder 38 is slidably mounted on each piston 37. The walls of the cylinders 38 may be slotted or cut away as at 39 so as to permit the cylinders 38 to slide on the pistons 37 without interference from the pin 36. Elongated or longitudinally extending passageways 40 are arranged in the pistons 37, and these passageways 40 communicate with ports 41 in the pin 36. A cup 42 of leather or the like, is connected to each end of each of the pistons 37 by means of a bolt 43, and these cups 42 may be provided with openings which register with the passageways 40. Each of the cylinders 38 may be provided with an aperture or opening 44 whereby air or fluid can pass between the compartment 30 and the interior of the cylinders 38, as the cylinders 38 reciprocate on the pistons 37. A rod 45 is secured to the upper end of each of the cylinders 38, and each of the rods 45 includes a portion 46 which is arranged in engagement with the offset portions 35 of the crankshaft 33.

From the foregoing it is apparent that there has been provided a fluid handling or tank cleaning mechanism which is an improvement over the device shown in prior Patent No. 2,681,250. In use, fluid such as water may be supplied from a source of supply under pressure through the hose 10, and this fluid passes through the bushing 14, and then through the rotary sleeve 18, and then through the slots 24. The fluid then passes out through the nozzle 25 and out through the diametrically opposed oppositely extending apertured portions 27. This fluid will issue in a stream against the surface to be cleaned so that the fluid impinging against the surfaces to be cleaned will cause the dirt or other foreign matter to be removed. At the same time, due to the force of the water issuing through the apertures 27, the nozzle 25 will rotate and this will cause rotation of the neck 23. As the neck 23 rotates, the gear 28 will travel around the stationary gear 16, since these two gears have their teeth arranged in meshing engagement with each other. Thus, it will be seen that a wide area can be covered or sprayed with the fluid issuing from the apertures 27, since the nozzle 25 will have two distinct directional movements, namely a rotary movement about an axis extending through the neck 23, and a rotary movement about an axis extending through the sleeve 18.

There is further provided a brake mechanism which prevents the nozzle 25 from traveling too fast whereby the fluid issuing from the apertures 27 will be discharged at the proper speed so as to prevent the formation of a fine spray instead of the desired liquid or fluid stream which is necessary to effect the proper cleaning. This braking mechanism comprises a crank 33 which is rotated by means of a gear 34 which is keyed thereto, and the gear 34 rotates when the gear 28 rotates, since these two gears are in meshing engagement with respect to each other. As the crankshaft 33 rotates, the pair of cylinders 38 will slide up and down on the pistons 37 so that fluid will be alternately moved from the top to the bottom of the cylinders, this fluid passing through the passageways 40 and apertures 41. The fluid inside the cylinders 38 may be a hydraulic brake fluid and may be stored in the compartment 30. The apertures 44 permit expansion of air as desired, and also permit some hydraulic fluid to leave and enter the cylinders to and from the compartment 30. Due to the provision of the hydraulic fluid in the cylinders 38, there will be a retarding action or slowing down tendency toward the movement of the cylinders 38 on the pistons 37 and this braking action will be transmitted through the crankshaft 33, gear 34, and then through the gear 28 and thus the speed of the nozzle 25 will be effectively regulated.

In the brake of the present invention, the cylinders 38 reciprocate up and down on the pistons 37, and the pistons 37 are free to oscillate slightly on the pin 36. The offset portions 35 on the crankshaft 33 are arranged 90 degrees with respect to each other so that there is a constant braking action exerted against the nozzle. If desired, some of the fluid from the compartment 30 may be fed through the slots 39 in the cylinders 38.

I claim:

1. In a fluid discharge mechanism, a tube adapted to be connected to a source of supply of fluid and including an enlarged interiorly threaded flange, a bushing including a portion arranged in threaded engagement with said flange, a first gear secured to said bushing, a rotary sleeve arranged contiguous to said bushing, a housing including a threaded portion connected to said sleeve, a cylindrical neck extending through said housing and provided with a plurality of openings for receiving fluid from said sleeve, a nozzle connected to said neck and provided with a pair of diametrically opposed oppositely extending apertures for the egress therethrough of fluid, a second gear member connected to said neck and meshing with said first gear, the lower portion of said housing defining a compartment, a crankshaft rotatably mounted in said housing and including a pair of offset portions, a gear member mounted on the outer end of said crankshaft and meshing with said second gear member, a pin mounted in said housing, a pair of pistons mounted on said pin and positioned in said compartment, a cylinder slidably mounted on each of said pistons, a rod extending from each of said cylinders and said rods being connected to the offset portions of said crankshaft, there being a longitudinally extending aperture in each of said pistons registering with apertures in said pin, said cylinders being provided with apertures therein intermediate their ends.

2. The structure as defined in claim 1, and further including a cover plate detachably connected to said housing.

3. The structure as defined in claim 2, wherein said compartment is adapted to hold a quantity of hydraulic brake fluid therein.

4. The structure as defined in claim 2, and further including yieldable cups secured to the ends of said pistons and mounted in said cylinders.

5. In a brake mechanism for a fluid discharge apparatus, a hollow housing, the lower portion of said housing defining a compartment, a crankshaft rotatably mounted in said housing and including a pair of offset portions, a gear member mounted on the outer end of said crankshaft, a pin mounted in said housing, a pair of pistons mounted on said pin and positioned in said compartment, a cylinder slidably mounted on each of said pistons, a rod extending from each of said cylinders and said rods being connected to the offset portions of said crankshaft, there being a longitudinally extending aperture in each of said pistons registering with apertures in said pins, said cylinders being provided with apertures therein intermediate their ends, a cover plate detachably connected to said housing, said compartment adapted to hold a quantity of hydraulic brake fluid therein, and yieldable cups secured to the ends of said pistons and mounted in said cylinders.

References Cited in the file of this patent

UNITED STATES PATENTS

| | | |
|---|---|---|
| 1,324,338 | Close | Dec. 9, 1919 |
| 1,841,287 | Gross | Jan. 12, 1932 |
| 1,884,041 | Marley | Oct. 25, 1932 |
| 2,261,155 | Hedrick | Nov. 4, 1941 |
| 2,681,250 | Metcalf | June 15, 1954 |

FOREIGN PATENTS

| | | |
|---|---|---|
| 1,063,264 | France | Dec. 16, 1953 |

OTHER REFERENCES

Abstract 80,752, volume 648, page 1542 of O. G., July 31, 1951.